(12) United States Patent
Hsieh et al.

(10) Patent No.: US 6,798,923 B1
(45) Date of Patent: Sep. 28, 2004

(54) APPARATUS AND METHOD FOR PROVIDING PANORAMIC IMAGES

(75) Inventors: Jun-Wei Hsieh, Hsinchu (TW); Cheng-Chin Chiang, Hsinchu (TW); Der-Lor Way, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/498,291

(22) Filed: Feb. 4, 2000

(51) Int. Cl.[7] ............................. G06K 9/36; H04N 7/00; G09G 5/00

(52) U.S. Cl. ...................... 382/284; 382/190; 382/240; 348/36; 345/629

(58) Field of Search ................................. 382/151, 162, 382/154, 169, 190, 195, 199, 201, 203, 216, 219, 254, 266, 268, 240, 278, 284, 289, 294, 295, 296; 345/629, 683, 630, 648; 348/222, 36, 218

(56) References Cited

U.S. PATENT DOCUMENTS

| | | | | |
|---|---|---|---|---|
| 5,613,013 A | * | 3/1997 | Schuette ...................... | 382/124 |
| 5,963,664 A | * | 10/1999 | Kumar et al. ................ | 382/154 |
| 5,987,164 A | * | 11/1999 | Szeliski et al. .............. | 382/154 |
| 6,075,905 A | * | 6/2000 | Herman et al. .............. | 382/284 |
| 6,349,153 B1 | * | 2/2002 | Teo .............................. | 382/294 |
| 6,434,276 B2 | * | 8/2002 | Hirosawa et al. ............ | 382/284 |
| 6,466,262 B1 | * | 10/2002 | Miyatake et al. ............ | 348/218 |
| 6,473,536 B1 | * | 10/2002 | Chiba et al. ................. | 382/284 |
| 6,486,908 B1 | * | 11/2002 | Chen et al. ................... | 348/39 |
| 6,516,099 B1 | * | 2/2003 | Davison et al. .............. | 382/284 |

OTHER PUBLICATIONS

Jacques Fayolle et al. "Application of Multiscale Characterization of Edges to Motion Determination" IEEE–1998, pp. 1174–1179.*

Mingu Sun et al. "Measurement of Signal Similarity Using the Maxima of the Wavelet Transform" IEEE–1993, pp. 583–586.*

* cited by examiner

*Primary Examiner*—Kanji Patel
(74) *Attorney, Agent, or Firm*—Fish & Richardson P.C.

(57) ABSTRACT

A method and system of merging a pair of images to form a seamless panoramic image including the following steps. A set of feature points are extracted along the edges of the images, each feature point defining an edge orientation. A set of registration parameters is obtained by determining an initial set of feature points from a first one of the images which matches a set of feature points of a second one of the images. A seamless panoramic image is rendered using the first and second images with the set of registration parameters.

7 Claims, 9 Drawing Sheets

APPARATUS AND METHOD FOR PROVIDING PANORAMIC IMAGES

FIELD OF THE INVENTION

The present invention relates to an apparatus, algorithm, and method for stitching different pieces of images of a scene into a panoramic environment map.

BACKGROUND

The most common way to electronically represent the real world is with image data. Unlike traditional graph-based systems, there are systems which use panoramic images to construct a virtual world. The major advantage of a system which uses panoramic images is that very vivid and photo-realistic rendering results can be obtained even when using PCs. In addition, the cost of constructing the virtual world is independent of scene complexity. In such systems, panoramic images are stitched together into a panoramic map from several individual images which are acquired by rotating a camera horizontally or vertically. This panoramic map can be used in different applications such as movie special effects, the creation of virtual reality, or games. A typical problem is how to stitch the different pieces of a scene into a larger picture or map. One approach to address this problem is to manually establish correspondences between images to solve unknown parameters of their relative transformation. Because manual methods are tedious for large applications, automatic schemes are preferably used for generating a seamless panoramic image from different pieces of images.

One proposed approach uses a nonlinear minimization algorithm for automatically stitching panoramic images by minimizing the discrepancy in intensities between images. This approach has the advantage of not requiring easily identifiable features. However, this technique does not guarantee finding the global minimum if the selection of starting points is not proper. Further because the optimization process is time-consuming, the approach is inefficient. In this invention, the domain of images under consideration is panoramic images.

SUMMARY OF THE INVENTION

The invention allows users to generate panoramic images from a sequence of images acquired by a camera rotated about its optical center. In general, the invention combines feature extraction, correlation, and relaxation techniques to get a number of reliable and robust matching pairs used to derive registration parameters. Based on the obtained registration parameters, different pieces of consecutive images can-be stitched together to obtain a seamless panoramic image.

In a first aspect, a method of merging a pair of images to form a seamless panoramic image includes the following steps. A set of feature points along the edges of the images is extracted, each feature point defining an edge orientation. A set of registration parameters is obtained by determining an initial set of feature points from a first one of the images which matches a set of feature points of a second one of the images. A seamless panoramic image is rendered using the first and second images with the set of registration parameters.

The invention provides a feature-based approach for automatically stitching panoramic images acquired by a rotated camera and obtaining a set of matching pairs from a set of feature points for registration. Since the feature points are extracted along the edges, each feature point specifies an edge orientation. Because the orientation difference between two panoramic images is relatively small, the difference between edge orientations of two feature points is also small if they are good matches. Based on this assumption, edge information of feature points can be used to eliminate in advance many false matches by checking their orientation difference. Moreover, many unnecessary calculations involving cross-correlation can be screened in advance, thereby significantly reducing the search time needed for obtaining correct matching pairs. After checking, by calculating the value of correlation of the remaining matching pairs, a set of possible matches can be selected with a predefined threshold. The set of possible matches are further verified through a relaxation scheme by calculating the quality of their matches. Once all of the correct matching pairs are found, they are then used to derive registration parameters. In this invention, an iterative scheme is applied to increase the reliability in providing matching results. Since only three iteration or fewer are needed and only a few feature points are involved in the matching pairs, the whole procedure can be accomplished very efficiently. Also, as discussed above, because the orientation difference of two feature points is checked in advance (before matching). Many calculations involving cross-correlation are not required and the efficiency of stitching is significantly improved. Compared with conventional algorithms, the proposed scheme offers improved efficiency and reliability for stitching images.

Embodiments of this aspect of the invention may include one or more of the following features. In one embodiment, a set of feature points are first extracted through wavelet formations. Among other advantages, the invention uses wavelet transforms to obtain a number of feature points with edge orientations. Such edge information can speed up the entire registration process by eliminating many impossible matches in advance and avoiding many unnecessary calculations of correlation. The method determines a number of reliable and robust matching pairs through relaxation. The method also measures the quality of a matching pair, imposes angle consistency constraint for improving the robustness of registration, and uses a voting concept to get the desired solution from the set of final matching results.

In other embodiments, the method forms the final panoramic image with the help of the registration results. In particular, the method adjusts the intensity differences between consecutive input images and blends the intensities of adjacent images to obtain a seamless panoramic image. The final panoramic images can then be used to build a virtual world.

Still other embodiments may include one or more of the following features:

For example, the method selects a number of feature points through wavelet transforms. Each feature point is associated with an edge orientation so that the speed of the registration process is increased.

The method uses an angle constraint to construct a set of matching pairs, which are used to obtain reliable matching results through a relaxation and a voting technique. The set of matching results are then used to form the final seamless panoramic image.

Constructing an initial set of matching pairs for registration includes comparing the edge orientation differences of feature points in one image and its corresponding feature points in another, calculating the values of correlation of each possible matching pair, and thresholding them with a predefined threshold.

Getting reliable matching results through relaxation and a voting technique includes calculating the quality of a matching pair, imposing angle consistency constraint to filter out impossible matching pairs, updating matching results through relaxation, and using the voting technique to obtain the reliable registration parameters. In addition, it refines the final registration results by using the correlation technique with a proper starting point.

Forming the final panoramic images includes dynamically adjusting and properly blending the intensity differences between adjacent images.

In another aspect, the invention features a system for merging pairs of images to form a panoramic image. The system includes an imaging device which, in operation, acquires a series of images, a storage for storing a series of images, a memory which stores computer code, and at least one processor which executes computer code to extract a set of feature points along the edges of the images, each feature point defining an edge orientation and to obtain a set of registration parameters by determining an initial set of feature points from a first one of the images which matches a set of feature points of a second one of the images, and to render a seamless panoramic image using the first and second images with the set of registration parameters.

Other advantages and features of the invention will become apparent from the following description, including the claims and the drawings.

DESCRIPTION

Figure 1:
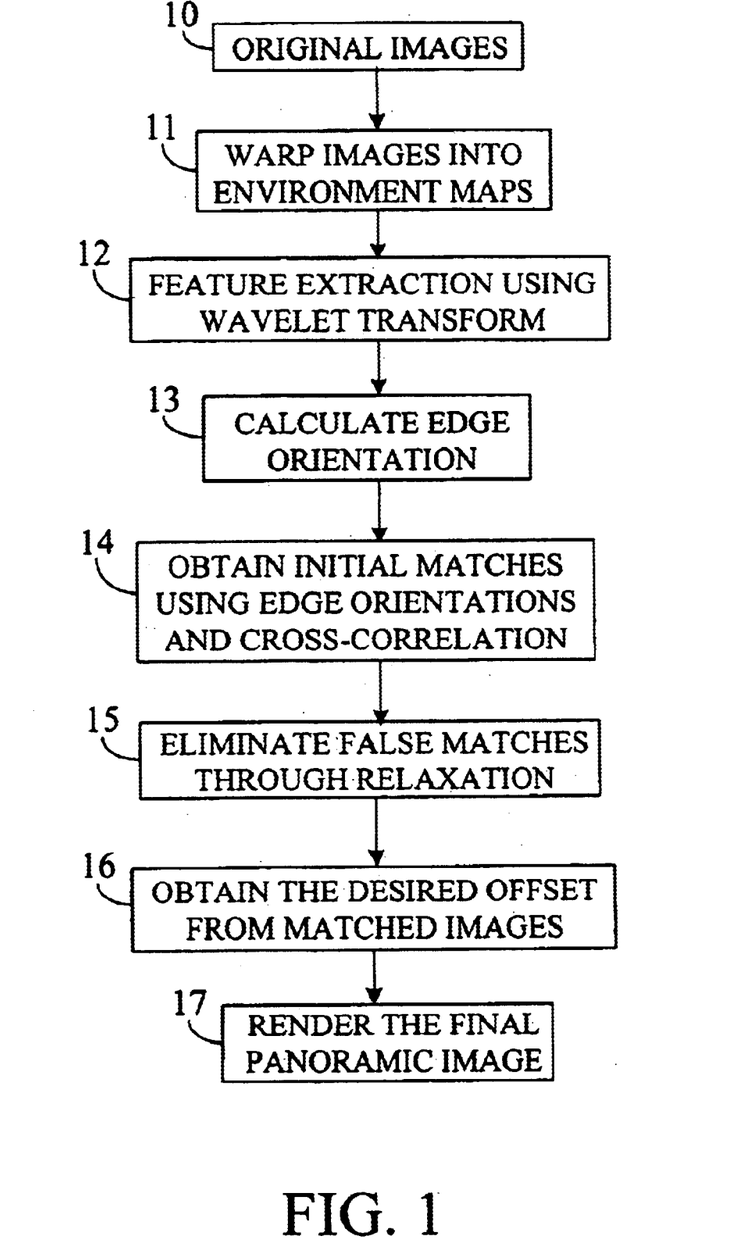
FIG. 1 illustrates an approach for generating a virtual panoramic world.

Referring first to the flow diagram of FIG. 1, a method of the general steps of generating a seamless panoramic image from different pieces of an image is shown.

Input Image Warping

Figure 2:
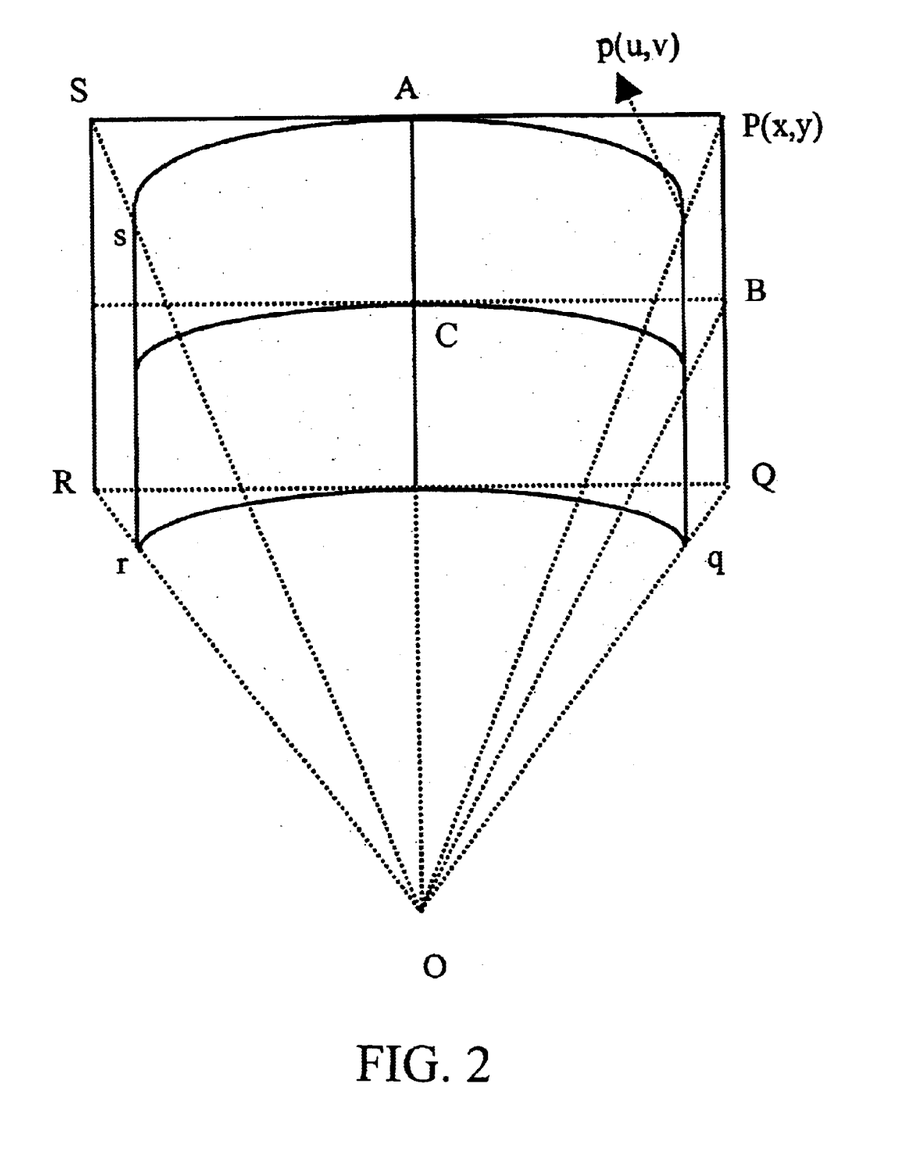
FIG. 2 shows the geometry for cylindrical mapping.

In general, it is difficult to seamlessly stitch two adjacent images together to form a panoramic image due to perspective distortion introduced by a camera. To remove the effects of this distortion, these images are preferably reprojected onto a simple geometry, e.g., a cube, a cylinder, or a sphere. In many applications, a cylindrical geometry is preferable since its associated geometrical transformation is simple. In this example, the cylindrical geometry is used. FIG. 2 illustrates the relationship between the cylindrical surface □pqrs and film plane □PQRS of the camera. Note that the plane □PQRS is tangent to the cylindrical surface □pqrs. Let O denote the optical center, C the center of image plane, f the focal length and r the radius of the cylinder. Further, assume that P(x, y) is a pixel in the image plane and p(u, v) is its corresponding pixel in the cylindrical map. Using FIG. 2, the coordinates of p (u, v) can be obtained as follows:

$$u = r\angle C\ OB = r\ \tan^{-1}\frac{\overline{CB}}{\overline{OC}} = r\ \tan^{-1}\frac{x}{f}, \quad (1)$$

and $$v = r\frac{\overline{PB}}{\overline{OB}} = r\frac{x}{\sqrt{x^2+f^2}}. \quad (2)$$

Moreover, since the radius r is equal to f, Equations (1) and (2) can be rewritten as follows:

$$u = f\ \tan^{-1}x/f \quad (3)$$

and $$v = f\frac{x}{\sqrt{x^2+f^2}}. \quad (4)$$

Based on Eqs. (3) and (4), input images are provided and then (step 10) warped into a cylindrical map for further registration to construct a complete panoramic scene (step 11).

Feature Extraction Using Wavelet Transform

Figure 3:
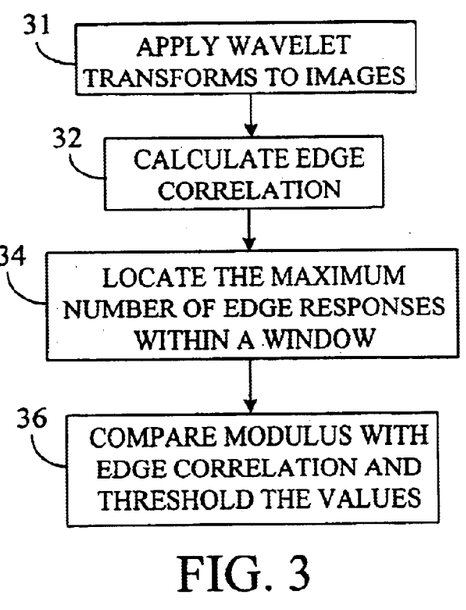
FIG. 3 is a flowchart illustrating the steps used to extract feature points from images using wavelet transform.

Referring again to FIG. 1 and FIG. 3, once the input images have been warped, useful features required for registration are extracted (step 12). This process advantageously uses a wavelet transform for feature extraction (step 31). In particular, all of the feature points are detected along the edges. First, let S(x, y) be a 2-D smoothing function. Two wavelets, $\psi^1(x, y)$ and $\psi^2(x, y)$ are the partial derivatives of the smoothing function S(x,y) in the x and y directions, respectively, where $$\psi^1(x, y) = \frac{\partial S(x, y)}{\partial x}$$

and $$\psi^2(x, y) = \frac{\partial S(x, y)}{\partial y}.$$

Let $$\psi^1_{2^j} = \frac{1}{4^j}\psi^1\left(\frac{x}{2^j}, \frac{y}{2^j}\right)$$

and $$\psi_{2^j}^2 = \frac{1}{4^j}\psi^2\left(\frac{x}{2^j}, \frac{y}{2^j}\right).$$

At each scale $2^j$, the 2-D wavelet transform of a function I(x,y) in $L^2(R^2)$ can be decomposed into two independent directions as follows:

$$W_{2^j}^1 I(x, y) = I * \psi_{2^j}^1(x, y) \text{ and } W_{2^j}^2 I(x, y) = I * \psi_{2^j}^2(x, y).$$

Basically, these two components are equivalent to the gradients of I(x,y) smoothed by S(x,y) at scale $2^j$ in the x and y directions. At a specific scale $s=2^i$, the modulus of the gradient vector of f(x,y) can be calculated as follows:

$$M_{2^j} I(x, y) = \sqrt{|W_{2^j\text{si }j}^{1}(x, y)|^2 + |W_{2^j\text{si }j}^{2}|^2}.$$

If the local maximum of $M_{2^j}I(x, y)$ are located and thresholded with a preset value, then the edge points of I(x,y) at scale $2^j$ can be detected. Since we are interested in specific feature points for scene registration, additional constraints have to be introduced. In general, noise is the main cause of false detection of edge points. In order to suppress the effect of noise, a criterion called edge correlation is introduced (step 32):

$$R_n(j, x, y) = \prod_{i=0}^{n-1} M_{2^{j+i}} I(x, y),$$

where n is a positive integer indicating the number of scales involved in the multiplication, and j represents the initial scale for edge correlation. $R_n$ reveals a peak whenever a true edge exists and is suppressed by the multiplication process if a point at location (x,y) is not a true edge. Thus, using the relationship for $R_n(j, x, y)$ above, the noise in an image can be suppressed while the true edges can be retained. In one embodiment of the invention, the number of scales for multiplication is chosen to be 2. In order to conserve the energy level, $R_n(j, x, y)$ should be normalized as follows:

$$\overline{R}_n(j, x, y) = R_n(j, x, y) \sqrt{\frac{MP(j)}{RP_n(j)}},$$

where $$MP(j) = \sum_{x,y} |M_{2^j} I(x, y)|^2$$

and $$RP_n(j) = \sum_{x,y} |R_n(j, x, y)|^2.$$

During the feature point selection process, an edge point is recognized as a candidate if its corresponding normalized edge correlation $R_2(j, x, y)$ is larger than its corresponding modulus value. Basically, the above mentioned process is equivalent to detecting an edge point with the strongest edge response in a local area. The three conditions which will be used to judge whether a point P(x,y) is a feature point or not are as follows:

Condition 1: P(x,y) must be an edge point of the image I(x,y). This means that P(x,y) is a local maxima of $M_{2^j}I(x, y)$, and $M_{2^j}I(x, y) >$ a threshold (step 34), Condition 2: $\overline{R}_2(1, x, y) > M_{2^j}I(x, y)$ (step 36),
Condition 3:

$$M_{2^j}I(x, y) = \max_{(x,y) \in N_p} \{M_{2^j}I(x, y)\},$$

where $N_p$ is the neighborhood of P(x,y) (step 34).

Obtaining Initial Matches Using Edge Orientations and Cross Correlation

Figure 4:
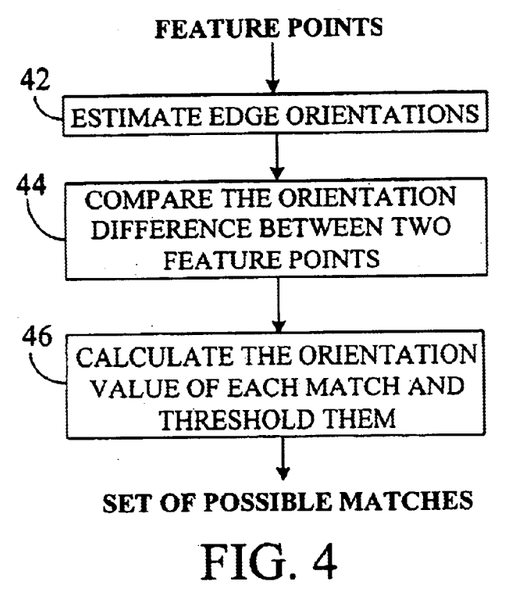
FIG. 4 is a flowchart illustrating the steps used to obtain an initial set of matches using edge orientations and correlation values.

Referring to FIG. 3 and 4, as part of step 12 of FIG. 1, a set of feature points is extracted using wavelet transform (step 31). Let $FP_{I_a} = \{p_i = (p_x^i, p_y^i)\}$ and $FP_{I_b} = \{q_i = (q_x^i, q_y^i)\}$ represent two sets of feature points extracted from two partially overlapping images $I_a$ and $I_b$ respectively. Assume that $N_{I_a}$ and $N_{I_b}$ represent the number of elements in the set of points $FP_{I_a}$ and $FP_{I_b}$, respectively. Let A(u) be the angle of an edge point u. A standard method for estimating the orientation of an edge-based feature point u at scale $2^j$ can be expressed as follows:

$$Arg(W_{2^j}^1 I(x, y) + W_{2^j}^2 I(x, y)).$$

However, the above representation can be very sensitive to noise. Therefore, an edge tracking technique plus a line-fitting model is used to solve the noise problem (step 41).

Let P be a feature point and $N_e$ be its neighborhood. Since P is an edge point, there should exist an edge line passing through it. By considering P as a bridge point, an edge line passing through P can be determined by searching in all the directions from P. All the edge points on the edge are then used as candidates for determining the orientation of the edge line. During the searching process, the edge connection constraint and the direction consistency constraint are used to restrict the searching domain. The edge connection constraint means that if $N_e$ contains another edge l but l does not pass P, all edge points in l will not be included in estimating the orientation of P. In certain cases, however, there will exist more than one edge line passing through P. In these cases, the first line detected is adopted to estimate the orientation. Let $l_1$ denote this line. The direction consistency constraint means all the edge points along other edge lines whose orientations are inconsistent with $l_1$ are not included to estimate the orientation of P. In this way, a set of edge points can be selected and then used to estimate the orientation of P using a line-fitting model. In other embodiments, other edge tracking technique can also be applied to provide a better estimation.

After the orientation is estimated, all feature points u will associate with an edge orientation A(u). For a feature point $p_i$ in the set of points $FP_{I_a}$ and $q_j$ in the set of points $FP_{I_b}$, the orientation difference between them is calculated as follows (step 42):

$$\theta_{ij} = A(q_j) - A(p_i).$$

In fact, if $p_i$ and $q_j$ provide a good match, the value of $\theta_{ij}$ will be small since the orientation of image $I_a$ is similar to that of $I_b$. Assuming this is the case, step 14 (FIG. 1) is performed to eliminate impossible false matches in advance, avoiding many unnecessary correlation calculations.

For a feature point $p_i$ in $FP_{I_a}$ and a feature point $q_j$ in $FP_{I_b}$, if they form a good match (step 44), the following condition will be satisfied:

$$|A(p_i) - A(q_j)| < 10°.  \hspace{2em} \text{Condition 1:}$$

Adding this criterion will significantly speed up the search time. On the other hand, if $p_i$ and $q_j$ form a good match, the similarity degree between $p_i$ and $q_j$ should be larger. A cross-correlation which can be used to measure the similarity degree between $p_i$ and $q_j$ (step 46) and is defined as follows (step 32):

$$C(p_i; q_j) = \frac{1}{\sigma_i \sigma_j (2M+1)^2} \sum_{x,y=-M}^{x,y=M} [I_a(x+p_x^i, y+p_y^i) - u_i][I_b(x+q_x^i, y+q_y^i) - u_j], \quad (5)$$

where $u_i$ and $u_i u_j$ are the local means of $p_i$ and $q_j$, respectively, $\sigma_i$ and $\sigma_j$ are the local variances of $p_i$ and $q_j$, respectively; and $(2M+1)^2$ represents the area of matching window. Based on this correlation measure, a pair $\{p_i \Leftrightarrow q_j\}$ is qualified as a possible matching pair if the following conditions are satisfied (step 33):

Condition 2: $C_{I_a I_b}(p_i; q_j) = \underset{q_k \in FP_{I_b}}{\text{Max}} C(p_i; q_k)$, Condition 3: $C_{I_a I_b}(p_i; q_j) = \underset{p_k \in FP_{I_a}}{\text{Max}} C(p_k; q_i)$, and Condition 4: $C_{I_a I_b}(p_i; q_j) > T_c$, where $T_c = 0.65$ (step 35).

Condition 2 means that given a feature point $p_i$ it is desired to find a point $q_j \in FP_{I_b}$ such that a the value of $C_{I_a I_b}(p_i; q_j)$ is maximized for all points $q_k \in FP_{I_b}$. Condition 3 means that given a feature points $q_j$, it is desired to find a point $p_i \in FP_{I_a}$ such that the value of $C_{I_a I_b}(p_i; q_j)$ is maximized. If only Condition 2 is used, it is possible that several points $p_i$ match with single point $q_j$. Conversely, if only Condition 3 is used, several points $q_j$ possibly will match with single point $p_i$. As for Condition 3, it forces the value of $C_{I_a I_b}$ of a matching pair to be larger than a threshold. In a preferred implementation, the orientation constraint will be checked first. If the constraint is not satisfied, it is not necessary to check Conditions 2, 3, and 4. In this way, only a few pairs are needed to calculate the cross-correlation measure $C_{I_a I_b}$, which is considered a time bottleneck of the whole process.

Eliminating False Matches through Relaxation

Figure 5:
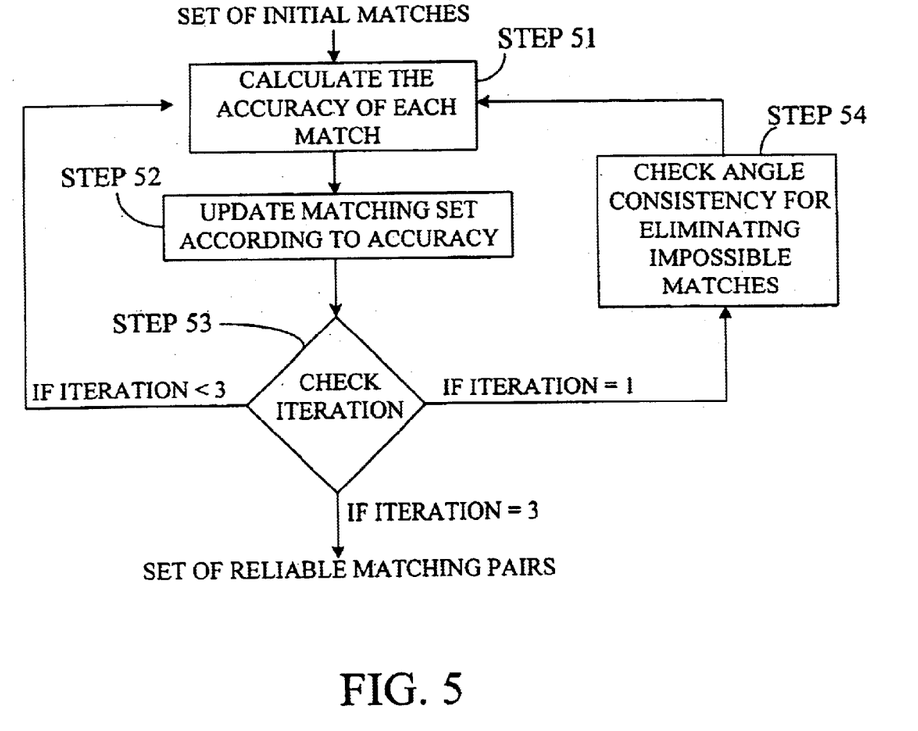
FIG. 5 is a flowchart illustrating the relaxation procedure used to obtain a set of reliable matching pairs.

Referring to FIGS. 1 and 5, a set of reliable matching pairs is obtained through relaxation. Let $MP_{I_a I_b} = \{p_i \Leftrightarrow q_i\}_{i=1,2\ldots}$ be the set of matching pairs which satisfy Conditions 1, 2, 3, and 4 above, where $p_i$ is a point in image $I_a(x, y)$ and $q_i$ is another point in image $I_b(x, y)$. Let $Ne_{I_a}(p_k)$ and $Ne_{I_b}(q_k)$ denote the neighbors of $p_k$ and $q_k$ within an area of radius R, respectively. Assume that $NP_{p_i q_j} = \{n_k^1 \Leftrightarrow n_k^2\}_{k=1,2\ldots}$ is the set of matching pairs, where $n_k^1 \in Ne_{I_a}(p_i)$, $n_k^2 \in Ne_{I_b}(q_j)$, and all elements of $NP_{p_i q_j}$ belong to $MP_{I_a I_b}$. The proposed method is based on a concept that if $\{p_i \Leftrightarrow q_i\}$ and $\{p_j \Leftrightarrow q_j\}$ provide a pair of good matches, the distance between $p_i$ and $p_j$ should be similar to the one between $q_i$ and $q_j$. Based on this assumption, we can measure the quality of a matching pair $\{p_i \Leftrightarrow q_i\}$ according to how many matches $\{n_j^1 \Leftrightarrow n_j^2\}$ in $NP_{p_i q_j}$ whose distance $d(p_i, n_j^1)$ is similar to the distance $d(q_i, n_j^2)$, where $d(u_i, u_j) = \|u_i - u_j\|$, the Euclidean distance between two points $u_i$ and $u_j$. With this concept, the measure of the quality of a match $\{p_i \Leftrightarrow q_i\}$ is defined as follows:

$$G_{I_a I_b}(i) = \sum_{\{n_k^1 \Leftrightarrow n_k^2\} \in NP_{p_i q_i}} \frac{r(i,k)}{1 + dist(i,k)}, \quad (6)$$

where $$dist(i,k) = [d(p_i, n_k^1) + d(q_i, n_k^2)]/2, \; r(i,k) = \begin{cases} e^{-u(i,k)/T_1} & \text{if } \mu(i,k) < T_2 \\ 0, & \text{otherwise} \end{cases}$$

with the two predefined thresholds $$T_1 \text{ and } T_2, \text{ and } u(i,k) = \frac{|d(p_i, r_k^1) - d(q_i, r_k^2)|}{dist(i,k)}.$$

The contribution of a pair $\{n_k^1 \Leftrightarrow n_k^2\}$ in $NP_{p_i q_i}$ monotonically decreases based on the value of $dist(i,k)$. Further, if the value of $u(i,k)$ is larger than the threshold $T_2$, the contribution of $\{n_k^1 \Leftrightarrow n_k^2\}$ is set to zero.

Referring to FIG. 5, after the quality of match of each pair $\{p_i \Leftrightarrow q_i\}$ in $MP_{I_a I_b}$ (step 51), relative quality value of each pair is obtained to $G_{I_a I_b}(i)$ to further eliminate false matches (step 51). Now, based on the quality value of each candidate match, a relaxation technique is used to eliminate false candidates for further registration. If we define the energy function as follow:

$$F = \sum_{\{p_i \Leftrightarrow q_i\} \in MP_{I_a I_b}} G_{I_a I_b}(i),$$

then the relaxation procedure can be formulated as follow:

Iterate {

– Compute the quality for each candidate match

– Choose the best possible candidates for minimizing $F$     according to the quality value $G_{I_a I_b}(i)$.

} until $F$ converges.

There are several strategies for updating the matching candidates. In one application an update strategy, referred to here as "some-looser-take-nothing" is used to update the matching candidates (step 52). First, according to the quality value of $G_{I_a I_b}(i)$, we sort each element of $MP_{I_a I_b}$ is sorted in increasing order (step 52). Then, a predetermined percentage Q% of matches in $MP_{I_a I_b}$ are eliminated as the impossible matches. Thus, the remaining (100–Q%) of matches are selected as potential matches for further relaxation (step 54). In our implementation, Q is set to 25. Three iterations are generally sufficient for achieving relaxation (step 53).

On the other hand, in order to make the matching results more reliable, the method includes an "angle consistency"

constraint (step 53) within the first iteration of the relaxation process to further eliminate impossible matching pairs. That is, if $\{p_i \Leftrightarrow q_i\}$ and $\{p_j \Leftrightarrow q_j\}$ are well matched, the angle between $\overrightarrow{p_i p_j}$ and $\overrightarrow{q_i q_j}$ must be close to zero. In this case, during this first iteration, for each element $\{p_i \Leftrightarrow q_i\}$ in $MP_{I_a,I_b}$, a counter $CA_i$ is used to record the number of matches $\{p_k \Leftrightarrow q_k\}$ in $MP_{I_a,I_b}$ where the angle between $\overrightarrow{p_i p_k}$ and $\overrightarrow{q_i q_k}$ is less than a predefined threshold $\theta$. According to the value of $CA_i$, the elements of $MP_{I_a,I_b}$ are sorted in increasing order. The first Q% of matches in $MP_{I_a,I_b}$ are considered to be impossible matches.

Obtaining the Desired Offset from Matches

After applying the relaxation process, a set of reliable matches is obtained. Referring to FIG. 1, the method uses a "voting" concept to derive a desired offset from the set of reliable matching pairs. For example, assume that this set is $CP_{I_a,I_b} = \{u_i \Leftrightarrow v_i\}_{i=1,2 \ldots N_e}$, where $N_e$ is the total number of elements in $CP_{I_a,I_b}$. In general, the 2-D point sets $\{u_i\}$ and $\{v_i\}$ satisfy the following relation:

$$v_i = u_i + T, \text{ for } i=1,2,3 \ldots, N_e,$$

where T is the desired solution. However, in real cases, different pairs $\{u_i \Leftrightarrow v_i\}$ will lead to different offsets $T_i$. Therefore, a voting technique is used to measure the quality of different solutions $T_i$. Let $S(i)$ denote a counter which records the number of solutions $T_k$ consistent with $T_i$. Two solutions $T_i$ and $T_k$ are said to be consistent if the distance between $T_i$ and $T_k$ is less than a predefined threshold. Since there are $N_e$ elements in $CP_{I_a,I_b}$, the total number of consistency tests will be $N_e(N_e-1)/2$. After applying the consistency test, the offset $\overline{T}$ associated with the maximum value of $S(i)$ is chosen as the desired solution.

Note that due to noise and image quality, the positions of feature points will not be precisely located and the accuracy of $\overline{T}$ is affected. In practical implementation, the y-component $\overline{T_y}$ of $\overline{T}$ is generally affected more then $\overline{T_x}$. Therefore, the following method is proposed to refine and correct the solution of $\overline{T_y}$ for the y-component. Let $\{u \Leftrightarrow v\}$ be the matching pair of $CP_{I_a,I_b}$ having the highest quality value. Given point u and the offset $\overline{T}$, the refined offset can be found by searching the local neighborhood of the point $(u+\overline{T})$ in another image $I_h$ using the correlation technique. However, if there is little texture information within the local neighborhood of the point u, the above approach will not necessarily provide a satisfactory solution. Let $$g_x(k) = \sum_{i=1}^{5} |I_a(u_x + i, k) - I_b(u_x - i, k)|$$

be the horizontal gradient of the point $(u_x, k)$ in $I_h$, where $u_x$ is the x-coordinate of u. Instead of using the starting point u directly, we use another starting point $\overline{u}$ for refining the desired offset $\overline{T}$ by searching the point $\overline{u}$ whose a horizontal gradient $g_x$ is largest along a column of pixels with the same x-coordinate $u_x$. Based on the starting point $\overline{u}$, the final offset can then be accurately obtained with the correlation technique.

Rendering the Final Panoramic Image

In general, when stitching two adjacent images, discontinuities of intensity exist between their common areas. Therefore, step 17 of FIG. 1 is used to eliminate such intensity discontinuities. The scheme used in step 17 can be divided into two stages. The first stage is used to adjust the intensities of two adjacent images such that their intensities are similar. The second stage is used to blend their image intensities according to a distance measure such that the final composite image appears smooth. Assume $I_a$ and $I_b$ are two adjacent images with their widths in $w_a$ and $w_b$, respectively. Let $\Delta I$ be the average intensity difference between the overlapping area of $I_a$ and $I_b$, that is, $$\Delta I = \frac{1}{|A|} \sum_{i \in A} (I_b(q(i)) - I_a(p(i))), \tag{7}$$

where A is the overlapping area of $I_a$ and $I_b$, $|A|$ is the number of pixels in A, $p(i)$ is a pixel in $I_a$, and $q(i)$ is its corresponding pixel in $I_b$.

Figure 6A:
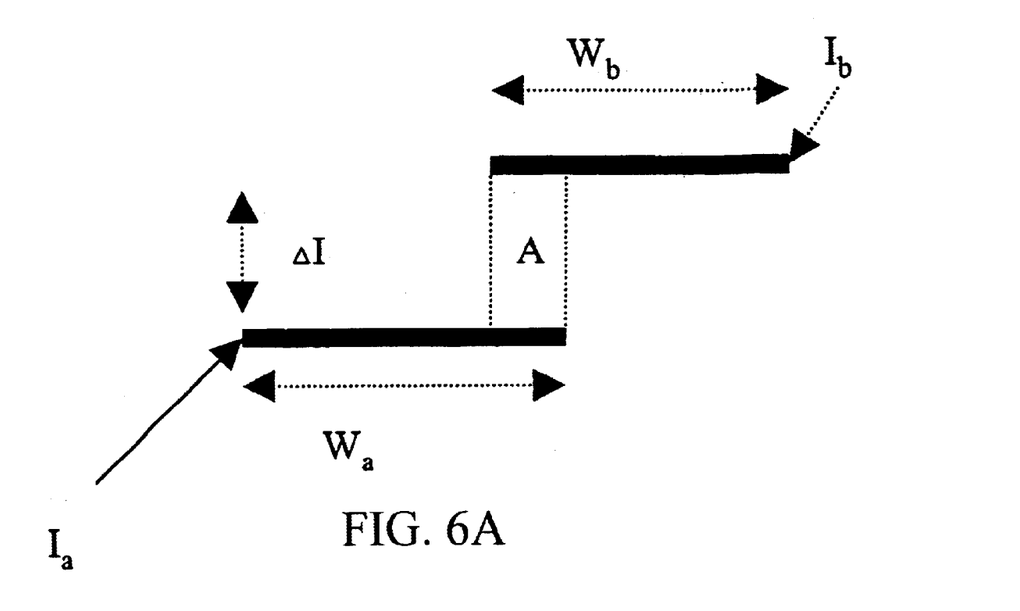
FIG. 6 illustrates adjusting intensities of $I_a$ and $I_b$ such that their intensity differences are small.
Figure 6B:
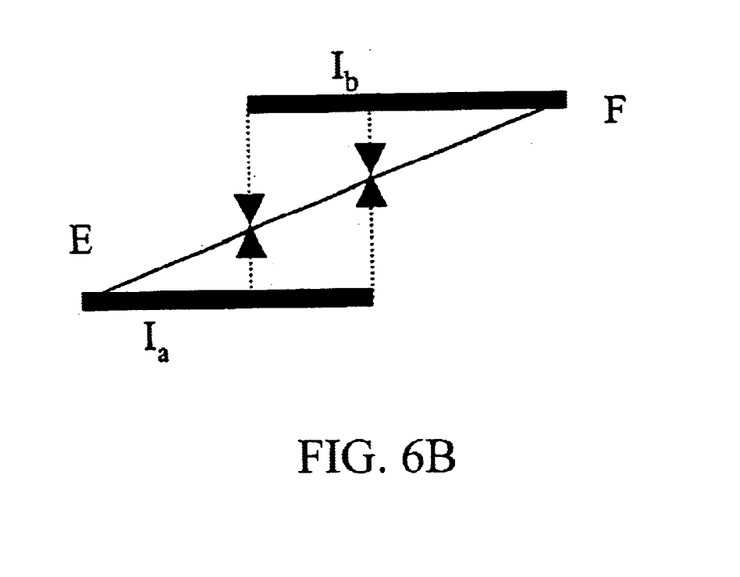

In particular, referring to FIGS. 6A and 6B, the gap of average intensity between $I_a$ and $I_b$ is about $\Delta I$. According to $\Delta I$, $w_a$, and $w_b$, the first stage is used to adjust the intensities of $I_a$ and $I_b$ as follows:

$$I_a(p(x,y)) = I_a(p(x,y)) + x \frac{\Delta I}{2w_1}, \tag{8}$$

and $$I_b(q(x,y)) = I_b(q(x,y)) + (x - w_2) \frac{\Delta I}{2w_2}. \tag{9}$$

After this adjusting step, the intensities of $I_a$ and $I_b$ in FIG. 6(a) will be gradually changed to approach the intensity line $\overline{EF}$ shown in FIG. 6(b), thereby bringing the intensities between $I_a$ and $I_b$ closer. As will be described below, in order to further smooth the intensity discontinuity between $I_a$ and $I_b$, a blending technique is then applied.

Figure 7:
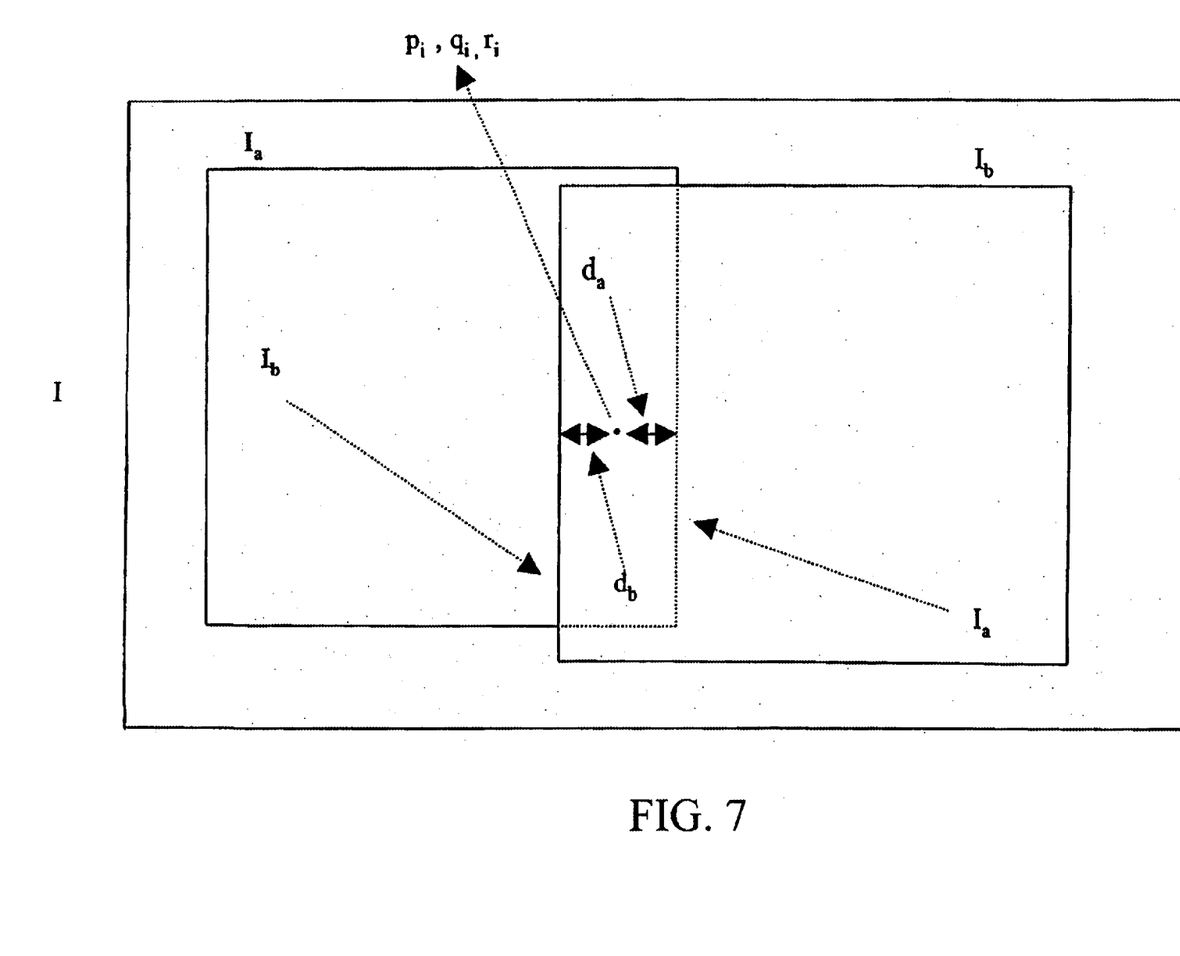
FIG. 7 illustrates an example for a blending technique.

The second stage uses a ray-casting method to blend different pixel intensities together. Referring to FIG. 7, $p_i$ is a pixel in $I_a$, $q_i$ is its corresponding pixel in $I_h$, and $I_a$ and $I_h$ are two boundary lines in $I_a$ and $I_h$, respectively. With $p_i$ and $q_i$, the intensity of the corresponding pixel $r_i$ in the composite image I can be obtained as follows:

$$I(r_i) = \frac{d_b^t I_a(p_i) + d_a^t I_b(q_i)}{d_a^t + d_b^t} \tag{10}$$

Where $d_a$ is the distance between $p_i$ and $I_a$, $d_h$ the distance between $q_i$ and $I_h$, and t is an adjustable parameter. Using Equation (10), the intensities in $I_a$ are gradually changed to approach the intensities of pixels in $I_h$ such that the final composite image I looks very smooth. In fact, if the blending area is chosen too large, a "ghostlike" effect will occur, particularly when moving objects in the common overlapping area exist between $I_a$ and $I_b$. However, since the intensities of $I_a$ and $I_b$ have been adjusted, the blending width can be chosen small such that the so-called ghostlike effect is significantly reduced. In one preferred embodiment, the blending width is chosen as one-third of the original width of the overlapping area.

Architecture for Implementation

Figure 8:
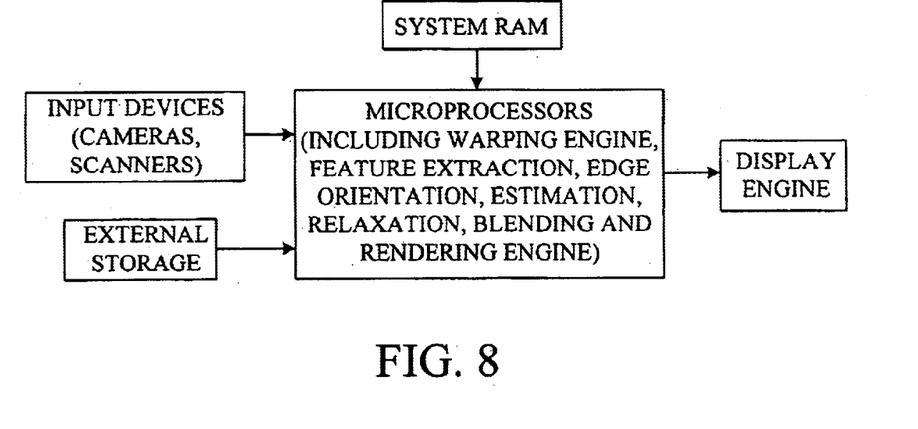
FIG. 8 shows an architecture for implementing the present invention.

Referring to FIG. 8, one preferred architecture for implementing the real-time stitcher apparatus, described above, includes input devices 60 (e.g., digital cameras or scanners) to acquire a series of panoramic images. Then, the panoramic images are stored into external storage 62 such as hard disks for further processing or being directly provided to one or more microprocessors 64 for stitching. The microprocessors 64 perform the stitching including warping, feature extraction, edge orientation estimation, correlation calculation, relaxation, rendering and blending the final panoramic images, etc. All the temporary data are stored in the system RAM memory to speed up stitching. Finally, the stitching result is sent to the display engine for displaying. In many applications this architecture can be implemented using a general personal computer.

Performance of the Invention

Figure 9:
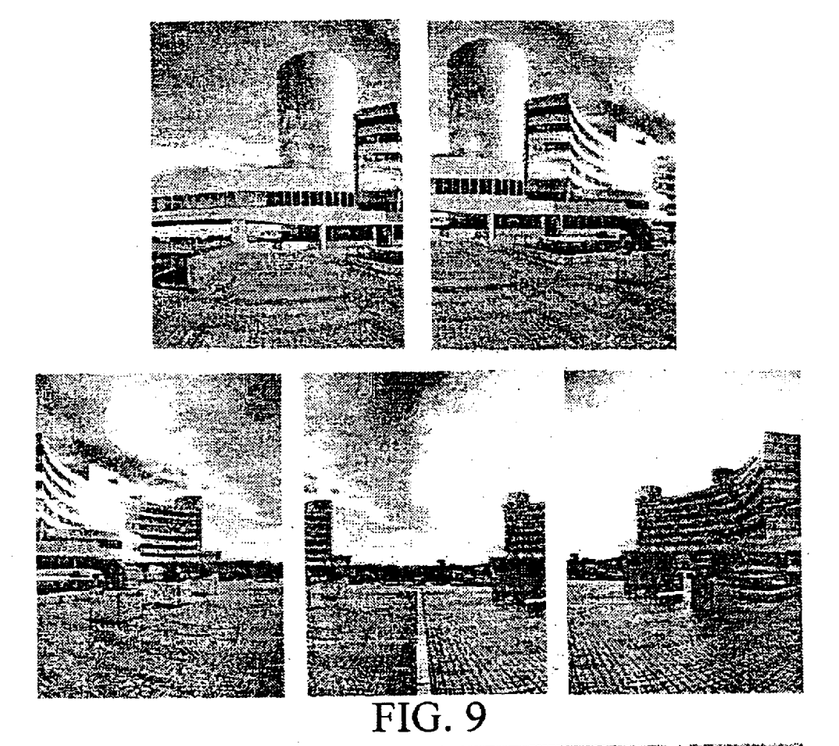
FIG. 9 shows a series of input images for stitching.

Referring to FIG. 9, to analyze the performance of the real-time stitcher apparatus, described above, a series of original panoramic images 9a–9e captured by a rotated camera were provided.

Figure 10:
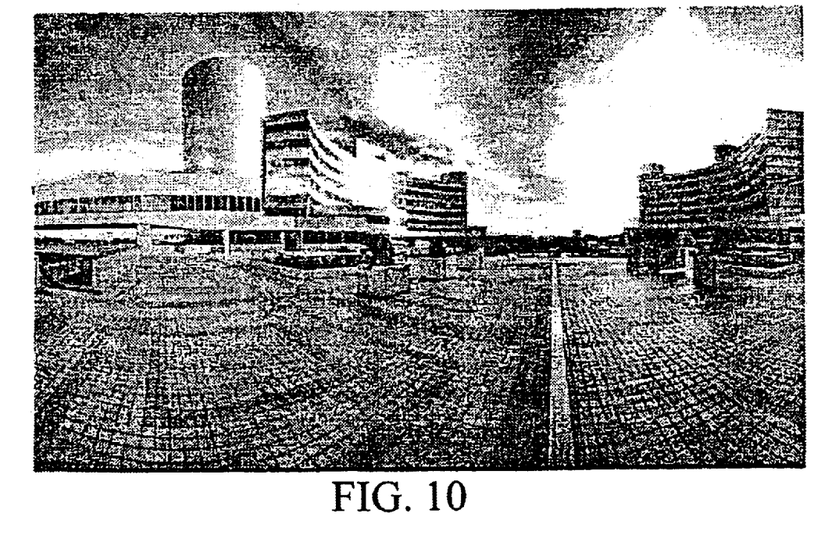
FIG. 10 shows the stitching result obtained by the proposed stitcher.
Figure 11:
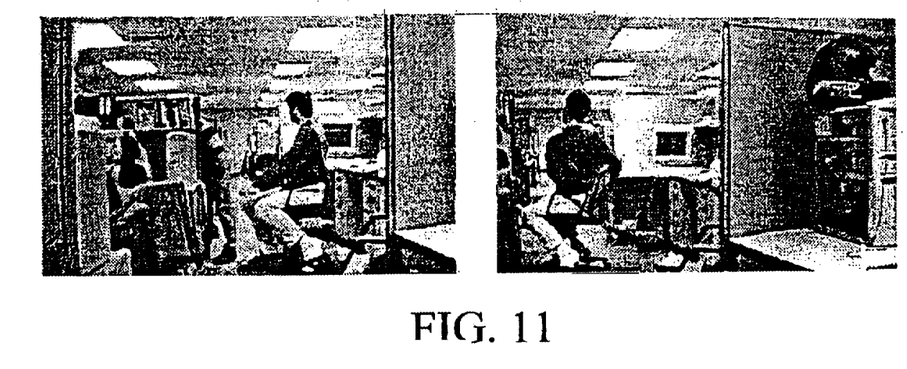
FIG. 11 shows images used to demonstrate the ghost-like effect.
Figure 12A:
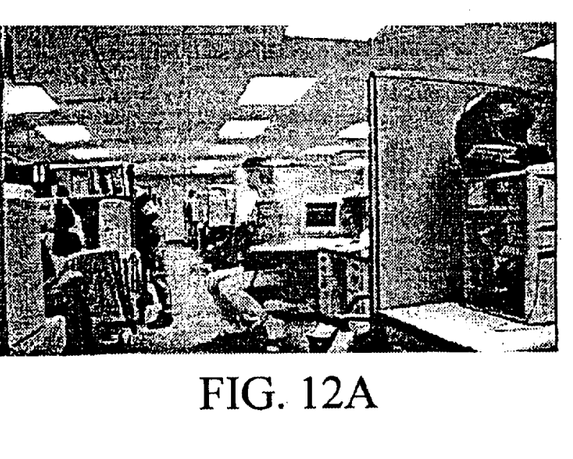
FIG. 12 shows how the ghostlike effect is removed: (a) with a wider blending width and (b) with a narrower blending width.
Figure 12B:
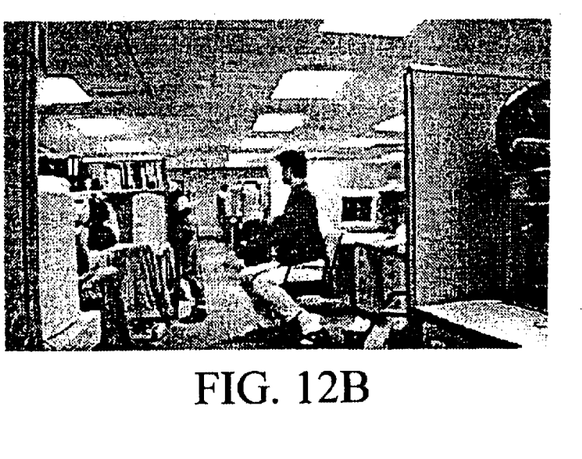

Referring to FIG. 10, the stitched panoramic image obtained by our proposed method is shown. In addition, if moving objects in two adjacent images exist, the proposed method can significantly minimize ghost-like effects. FIG. 11 shows two adjacent images with moving objects. The posture of the man in (a) is clearly different from the one in (b). Besides, large intensity differences exist between them. In order to smooth such large intensity differences, the blending width should be chosen to be large. However, with a large area, the ghost-like effect will appear in the final composite image (see FIG. 12(*a*)). Contrary to the previous technique, with our proposed blending technique, since the intensities of input images have been adjusted before blending, the blending width can be chosen smaller. Therefore, the ghostlike effect is significantly lessened, the quality of (b) is clearly improved over the quality shown in FIG. 12(*a*).

What is claimed is:

1. A method of merging a different pair of images to form a seamless panoramic image comprising:
    extracting a set of feature points along the edges of the images, each feature point defining an edge orientations, wherein
        extracting the set of feature points along the edges of the images includes applying wavelet transforms to the images;
    obtaining a set of registration parameters by determining an initial set of feature points from a first one of the images which matches a set of feature points of a second one of the images; and
    rendering a seamless panoramic image using the first and second images with the set of registration parameters.

2. The method of claim 1, wherein determining the initial set of matching pairs includes a relaxation technique, including the steps of:
    calculating the edge orientation of each feature point;
    comparing the orientation difference between the matching pair;
    calculating the value of correlation of the matching pair; and
    comparing the value of correlation with a predefined threshold.

3. The method of claim 1, wherein extracting the set of feature points, includes: calculating an edge correlation for each image;
    locating the feature point whose edge response is the maxima within a window;
    comparing the maxima with a predefined threshold.

4. The method of claim 1, wherein obtaining the set of reliable registration parameters, comprises:
    determining an initial set of matching pairs for registration;
    calculating a quality value for the initial set of matching pairs;
    updating the matching result according to the quality value of the match; imposing an angle consistency constraint to filter out impossible matches; and using a voting technique to obtain the registration parameters.

5. The method of claims 1, wherein rendering the seamless panoramic image comprises:
    dynamically adjusting the intensity differences between adjacent images; and properly blending the intensity difference between consecutive images.

6. A system for merging a pair of images to form a panoramic image comprising:
    an image device which, in operation, acquires a series of images;
    a storage for storing the series of images:
    a memory which stores computer code; and
    at least one processor which executes the computer code to:
        extract different sets of feature points along the edges of each input image, each feature point defining an edge orientation;
        extract a set of feature points along the edges of the images by applying wavelet formations to the images, each feature point defining an edge of orientation;
        obtain a set of registration parameters by determining an initial set of feature points from a first one of the images which matches a set of feature points of a second one of the images; and
        render a seamless panoramic image using the first and second images with the set of registration parameters.

7. The system of claim 6, wherein the processor extracts the set of feature points, including:
    calculating an edge correlation for each image;
    locating the feature point whose edge response is the maxima within a window;
    comparing the maxima with a predefined threshold.

* * * * *